United States Patent
Hausman

(10) Patent No.: US 7,124,206 B2
(45) Date of Patent: Oct. 17, 2006

(54) PLC TO PLC COMMUNICATIONS WITH A MODEM ON THE PLC I/O BUS

(75) Inventor: Steven Michael Hausman, Johnson City, TN (US)

(73) Assignee: Siemens Energy & Automation, Inc., Alpharetta, GA (US)

(*) Notice: Subject to any disclaimer, the term of this patent is extended or adjusted under 35 U.S.C. 154(b) by 773 days.

(21) Appl. No.: 10/271,921

(22) Filed: Oct. 16, 2002

(65) Prior Publication Data

US 2003/0188033 A1 Oct. 2, 2003

Related U.S. Application Data

(60) Provisional application No. 60/346,438, filed on Jan. 7, 2002, provisional application No. 60/341,539, filed on Dec. 18, 2001, provisional application No. 60/341,386, filed on Dec. 18, 2001, provisional application No. 60/341,384, filed on Dec. 18, 2001.

(51) Int. Cl.
*G06F 15/16* (2006.01)
(52) U.S. Cl. ............... 709/250; 709/205; 709/217; 709/220
(58) Field of Classification Search ................ 709/250; 710/11
See application file for complete search history.

(56) References Cited

U.S. PATENT DOCUMENTS 5,541,955 A * 7/1996 Jacobsmeyer ............... 375/222
6,567,709 B1 * 5/2003 Malm et al. ................... 700/21
6,745,090 B1 * 6/2004 Malizia, Jr. ................... 700/65
6,745,254 B1 * 6/2004 Boggs et al. ................. 710/11
2001/0037491 A1 11/2001 Boggs et al.

FOREIGN PATENT DOCUMENTS

EP   0 340 613 A1   11/1989

OTHER PUBLICATIONS

PCT International Search Report of PCT/US 02/38043 dated May 16, 2003 and received May 19, 2003.

* cited by examiner

*Primary Examiner*—Zarni Maung
*Assistant Examiner*—Glenford J. Madamba

(57) ABSTRACT

At least one exemplary embodiment of the present invention includes a system comprising a first modem integral to a first programmable logic controller, and a second modem integral to a second programmable logic controller, the first modem adapted to communicate with the second modem via a communications network. At least one exemplary embodiment of the present invention includes a method comprising coupling a first modem to a second modem, the first modem integral to a first programmable logic controller, the second modem connected to a second programmable logic controller, and transferring data between the first modem and the second modem. It is emphasized that this abstract is provided to comply with the rules requiring an abstract that will allow a searcher or other reader to quickly ascertain the subject matter of the technical disclosure. This abstract is submitted with the understanding that it will not be used to interpret or limit the scope or meaning of the claims. 37 CFR 1.72(b).

23 Claims, 10 Drawing Sheets

11000

PLC TO PLC COMMUNICATIONS WITH A MODEM ON THE PLC I/O BUS

CROSS-REFERENCE TO RELATED APPLICATIONS

This application claims priority to, and incorporates by reference herein in its entirety, the following pending provisional applications:
Ser. No. 60/346,438, filed 7 Jan. 2002;
Ser. No. 60/341,386, filed 18 Dec. 2001;
Ser. No. 60/341,539, filed 18 Dec. 2001; and
Ser. No. 60/341,384, filed 18 Dec. 2001.

This application is related to, and incorporates by reference herein in its entirety, the following co-pending applications:
Ser. No. 10/272,115, titled "Modem Function Incorporated in Programmable Logic Controller", filed 16 Oct. 2002;
Ser. No. 10/272,592, titled "Numeric and Text Paging with an Integral PLC Modem", filed 16 Oct. 2002; and
Ser. No. 10/272,114, titled "Security Features for a PLC Modem", filed 16 Oct. 2002.

BRIEF DESCRIPTION OF THE DRAWINGS

The invention and its wide variety of potential embodiments will be readily understood via the following detailed description of certain exemplary embodiments, with reference to the accompanying drawings in which.

DETAILED DESCRIPTION

At least one exemplary embodiment of the present invention includes a system comprising a modem adapted to be integrated into a programmable logic controller and adapted to facilitate communications with a main processor of the programmable logic controller via a communications medium. At least one exemplary embodiment of the present invention includes a method comprising receiving a message from a main processor of a programmable logic controller, modulating the message within the programmable logic controller, and transmitting the message via a communications network. At least one exemplary embodiment of the present invention includes a method comprising receiving a message at a programmable logic controller from a communications network, demodulating the message within the programmable logic controller, and delivering the message to a main processor of the programmable logic controller.

At least one exemplary embodiment of the present invention includes a system comprising a first modem integral to a first programmable logic controller, and a second modem integral to a second programmable logic controller, the first modem adapted to communicate with the second modem via a communications network. At least one exemplary embodiment of the present invention includes a method comprising coupling a first modem to a second modem, the first modem integral to a first programmable logic controller, the second modem connected to a second programmable logic controller, and transferring data between the first modem and the second modem.

At least one exemplary embodiment of the present invention includes a method comprising formatting a message at a first modem integral to a first programmable logic controller, and transmitting the formatted message from the first modem via a communications network. At least one exemplary embodiment of the present invention includes a system comprising a means for formatting a message at a modem integral to a programmable logic controller, and means for transmitting the formatted message from the modem via a communications network.

At least one exemplary embodiment of the present invention includes a method comprising receiving a connection request at a modem integral to a programmable logic controller, and allowing access to the programmable logic controller via the modem. At least one exemplary embodiment of the present invention includes a method comprising establishing a connection between a calling device and a modem integral to a programmable logic controller, and allowing the calling device access to the programmable logic controller via the modem.

Figure 1:
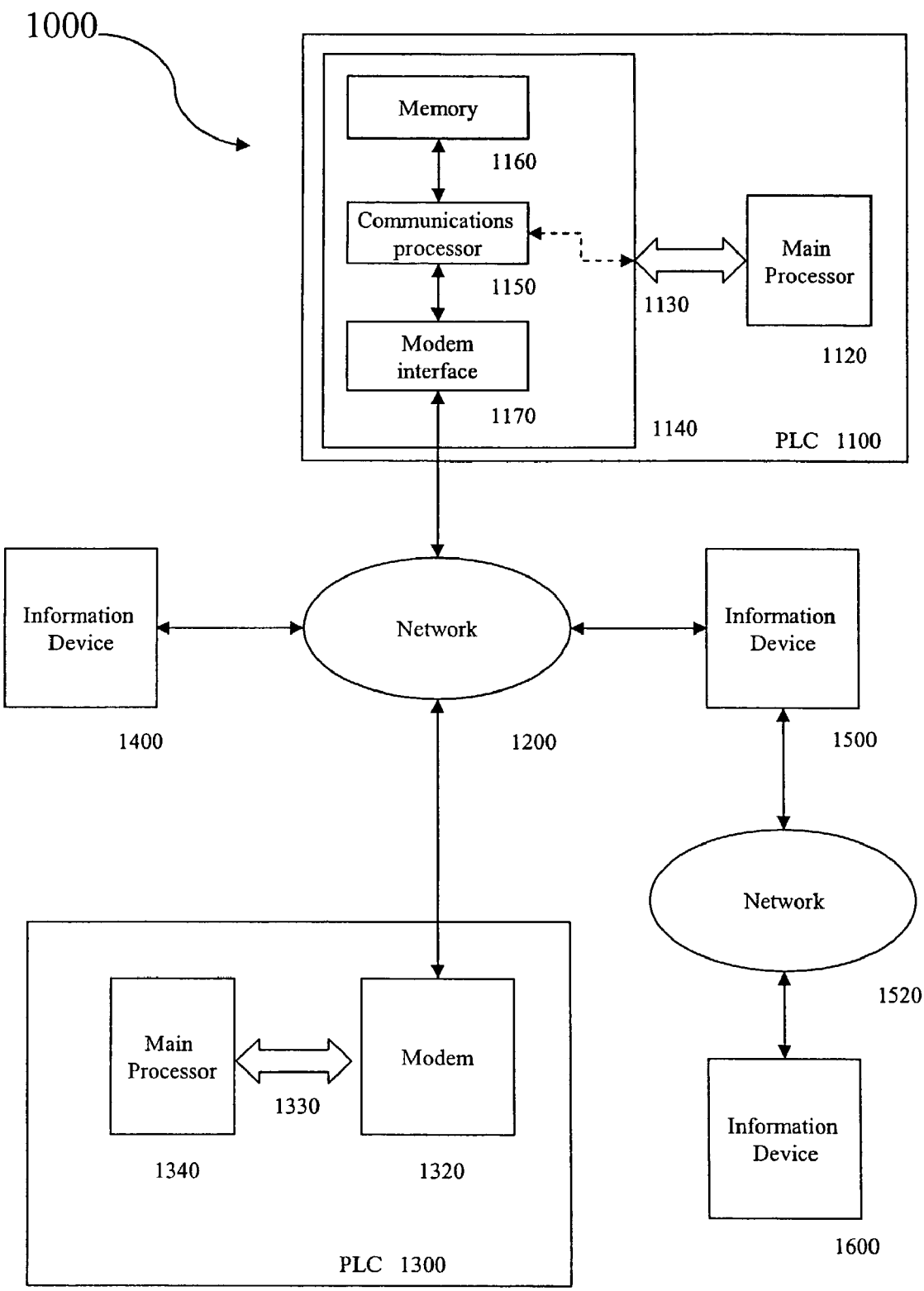
FIG. 1 is a block diagram of an exemplary embodiment of a system 1000 of the present invention.

FIG. 1 is a block diagram of an exemplary embodiment of a system 1000 of the present invention. System 1000 can include a first programmable logic controller ("PLC") 1100 comprising a main processor 1120 coupled via a connector 1130 to a modem 1140. In certain embodiments, modem 1140 can connect to a connector 1300 such as a system backplane and/or an expansion input/out bus, thereby freeing a communication port of processor 1200.

Modem 1140 can be integral to PLC 1100. That is, once installed, modem 1140 can be a component of PLC 1100, rather than free-standing. Modem 1140 can include a communications processor 1150 having a data storage means 1160, such as a dual port RAM, and a communications interface 1170, such as a telephone line interface, a wireless network interface, a cellular network interface, a local area network interface, a broadband cable interface, etc. Modem 1140 can form a connection, and/or can receive, read, process, format, configure, modulate, demodulate, transmit, and/or deliver a message, which can include data. Modem 1140 can be modular in design, having its own chassis, and can draw power from connector 1130 and/or PLC 1100.

Modem 1140 can be connected to a communications network 1200, such as a public service telephone network (PSTN), a wireless network, a cellular network, a local area network, the Internet, etc. Also connected to network 1200 can be a second PLC 1300, which can also have an integral modem 1320, which can be coupled via connector 1330 to a main processor 1340.

Connected to network 1200 also can be a first information device 1400, such as a traditional telephone, telephonic device, cellular telephone, mobile terminal, Bluetooth device, communicator, pager, facsimile, computer terminal, personal computer, etc. Moreover, a second information device 1500 can be connected to network 1200, and the second information device 1500 can communicate with a third information device 1600 either via network 1200 or via a second network 1520.

Figure 2:
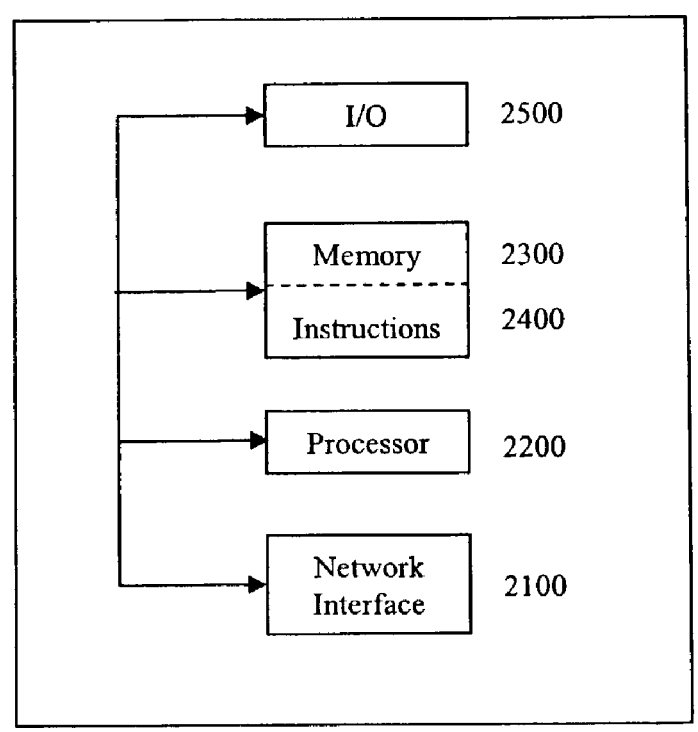
FIG. 2 is a block diagram of an exemplary embodiment of an information device 2000 of the present invention.

FIG. 2 is a block diagram of an exemplary embodiment of an information device 2000 of the present invention. Information device 2000 can represent any information device 1400, 1500, or 1600 of FIG. 1. Information device 2000 can include well-known components such as one or more network interfaces 2100, one or more processors 2200, one or more memories 2300 containing instructions 2400, and/or one or more input/output (I/O) devices 2500, etc.

In one embodiment, network interface 2100 can be a telephone, a cellular phone, a cellular modem, a telephone data modem, a fax modem, a wireless transceiver, an ethernet card, a cable modem, a digital subscriber line interface, a bridge, a hub, a router, or other similar device.

Each processor 2200 can be a general purpose microprocessor, such the Pentium III series of microprocessors manufactured by the Intel Corporation of Santa Clara, Calif. In another embodiment, the processor can be an Application Specific Integrated Circuit (ASIC) or a Field Programmable Gate Array (FPGA) which has been designed to implement in its hardware and/or firmware at least a part of a method in accordance with an embodiment of the present invention.

Memory 2300 can be coupled to a processor 2200 and can store instructions 2400 adapted to be executed by processor 2200 according to one or more activities of a method of the present invention. Memory 2300 can be any device capable of storing analog or digital information, such as a hard disk, Random Access Memory (RAM), Read Only Memory (ROM), flash memory, a compact disk, a digital versatile disk (DVD), a magnetic tape, a floppy disk, and any combination thereof.

Instructions 2400 can be embodied in software, which can take any of numerous forms that are well-known in the art.

Any input/output (I/O) device 2500 can be an audio and/or visual device, including, for example, a monitor, display, keyboard, keypad, touchpad, pointing device, microphone, speaker, video camera, camera, scanner, and/or printer, including a port to which an I/O device can be attached or connected.

Figure 3:
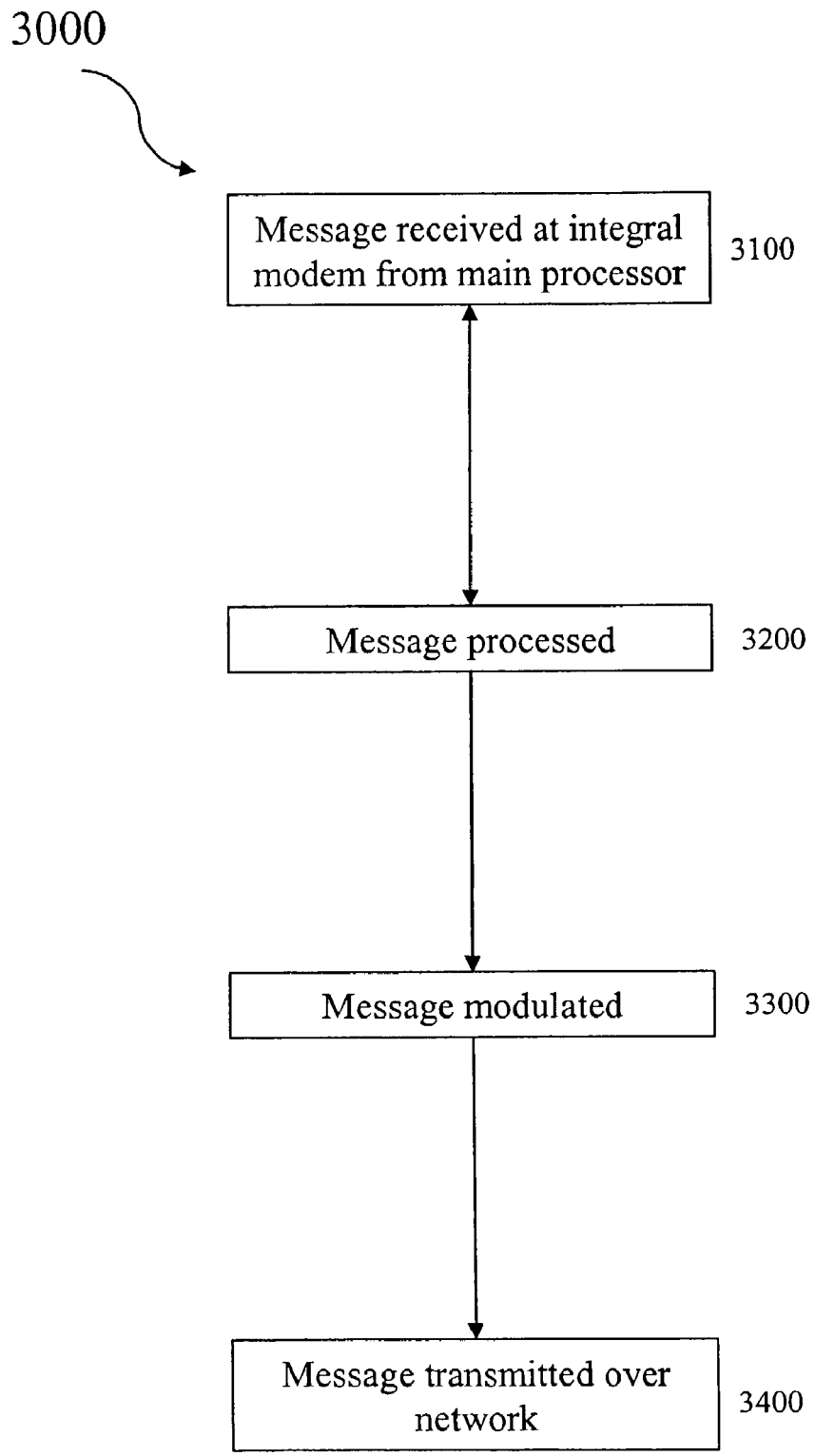
FIG. 3 is a flowchart of an exemplary embodiment of a method 3000 of the present invention.

FIG. 3 is a flowchart of an exemplary embodiment of a method 3000 of the present invention. At activity 3100, a message is received from the main processor of the PLC at the integral modem of the PLC. At activity 3200, the message is processed by the modem. At activity 3300, the processed message is modulated, and at activity 3400, the modulated message is transmitted over a communications network, such as a telephone network. The modulated message can conform to any of numerous configurations, protocols, and/or standards. For example, the modulated message can be a 10 bit, V.34, ASCII, TAP message.

Figure 4:
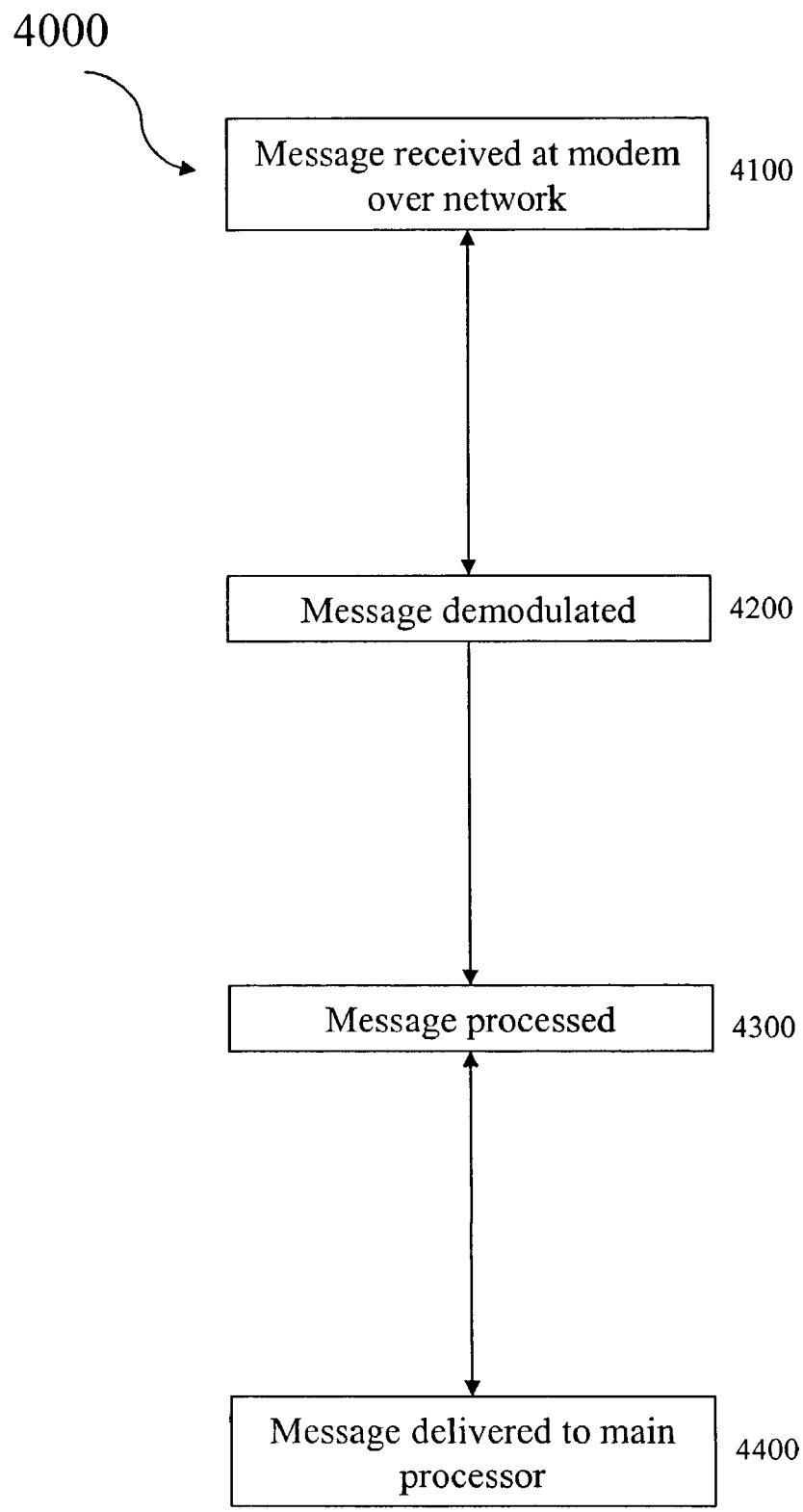
FIG. 4 is a flowchart of an exemplary embodiment of a method 4000 of the present invention.

FIG. 4 is a flowchart of an exemplary embodiment of a method 4000 of the present invention. At activity 4100, a message is received at the integral modem of the PLC via a network. At activity 4200, the message is demodulated. At activity 4300, the demodulated message is processed by the modem. At activity 3400, the processed message is delivered to a main processor of the PLC.

Figure 5:
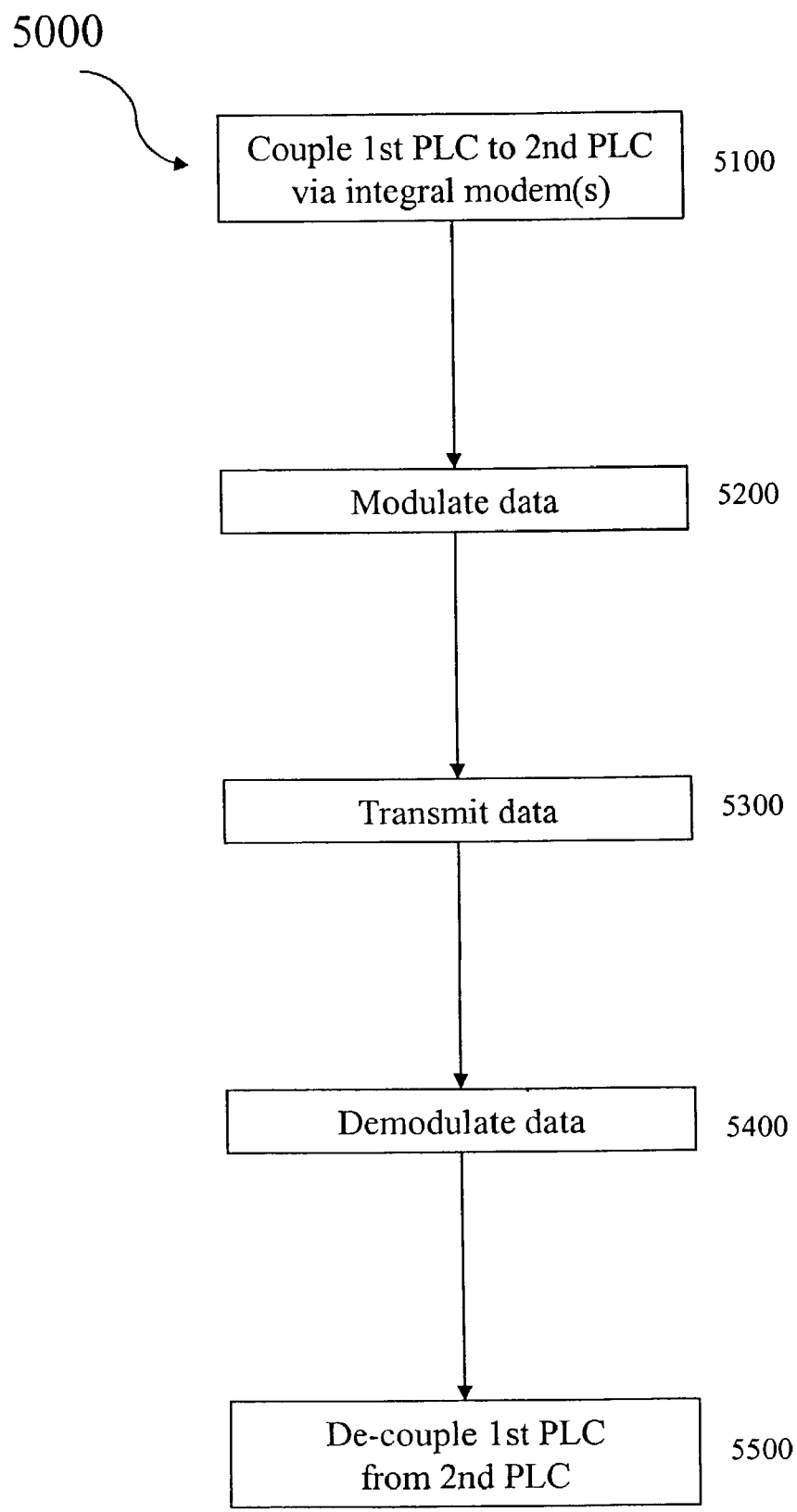
FIG. 5 is a flowchart of an exemplary embodiment of a method 5000 of the present invention.

FIG. 5 is a flowchart of an exemplary embodiment of a method 5000 of the present invention. At activity 5100, a modem integral to a first PLC can be coupled to a modem of a second PLC. The modem of the second PLC can be integral to the second PLC or separate from the second PLC. At activity 5200, the modem of the first PLC can modulate data, and at activity 5300, transmit the modulated data to the modem of the second PLC. Upon receiving the modulated data, the modem of the second PLC can demodulate the data and respond accordingly, such as by processing and/or forwarding the data to a processor of the second PLC, or by replying to the modem of the first PLC. At activity 5500, the modem of the first PLC can be de-coupled from the modem of the second PLC.

Figure 6:
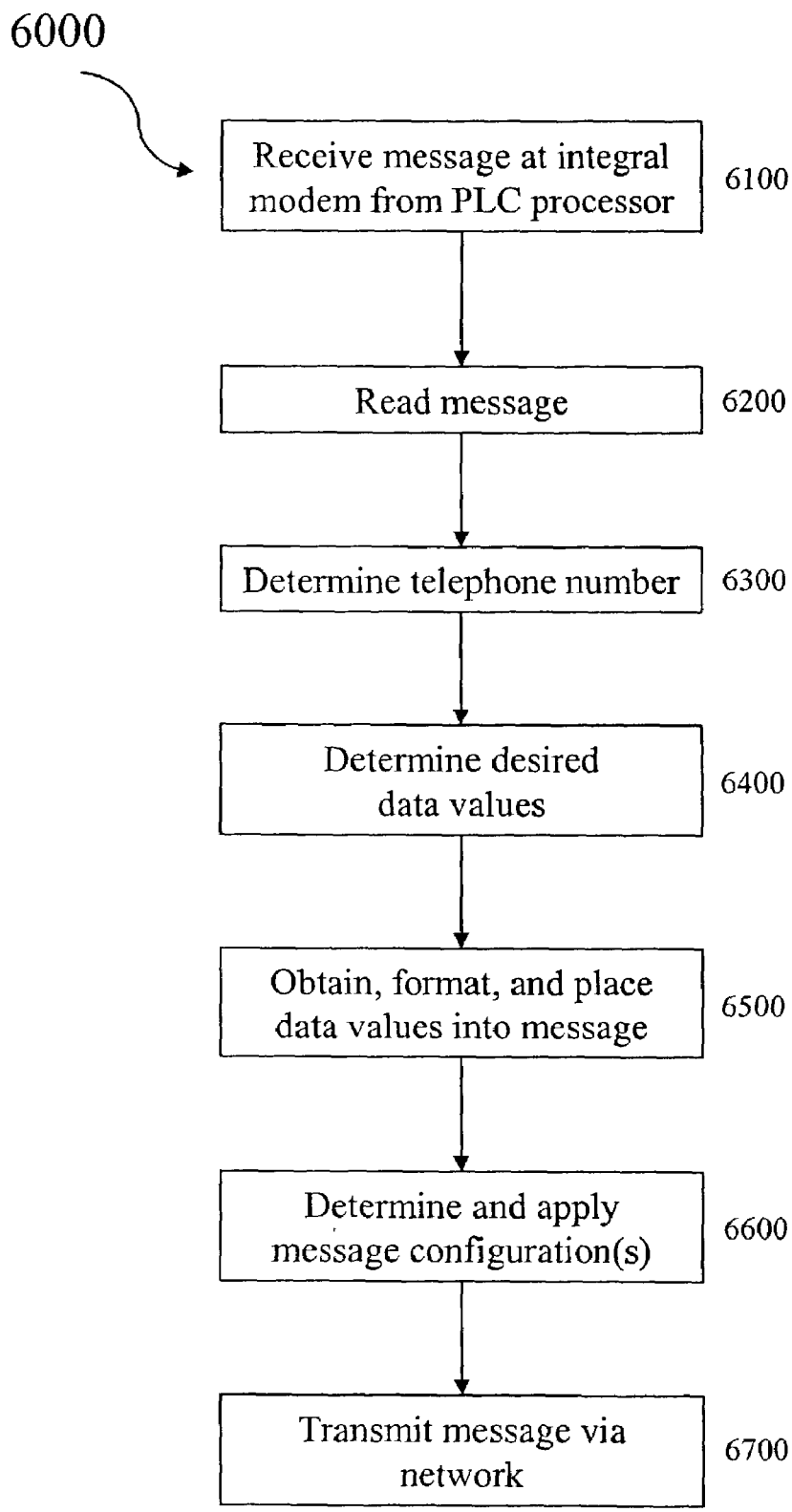
FIG. 6 is a flowchart of an exemplary embodiment of a method 6000 of the present invention.

FIG. 6 is a flowchart of an exemplary embodiment of a method 6000 of the present invention. At activity 6100, a modem integral to a PLC can receive a message specification from a processor of the PLC. In some exemplary embodiments, the message can be a paging message specification. At activity 6200, the modem can read the message specification. At activity 6300, the modem can determine a device to attempt to access, such as by dialing a telephone number included in the message specification. At activity 6400, the modem can identify one or more data variables in the message specification. At activity 6500, the modem can obtain, format, and place the data values corresponding to the specified data variables into a message. At activity 6600, the modem can apply one or more message configuration(s) to the message as defined by the message specification and/or other configuration defining means, such as DIP switches, firmware, etc. For example, the modem can apply any of numerous pre-selected formats, modem standards, and/or protocols to the message. At activity 6700, the modem can transmit the message via a communications network, possibly in accordance with the message specification and/or message configuration(s), to a pagable device and/or a communications device, such as a telephone, a cellular phone, a "smart" phone (such as a Handspring Treo-like device), a pager, a paging service, a messaging service (e.g., Blackberry), a computer terminal, a personal computer, a personal organizer (such as a Palm-like device), a wireless device, a mobile terminal, etc.

Figure 7:
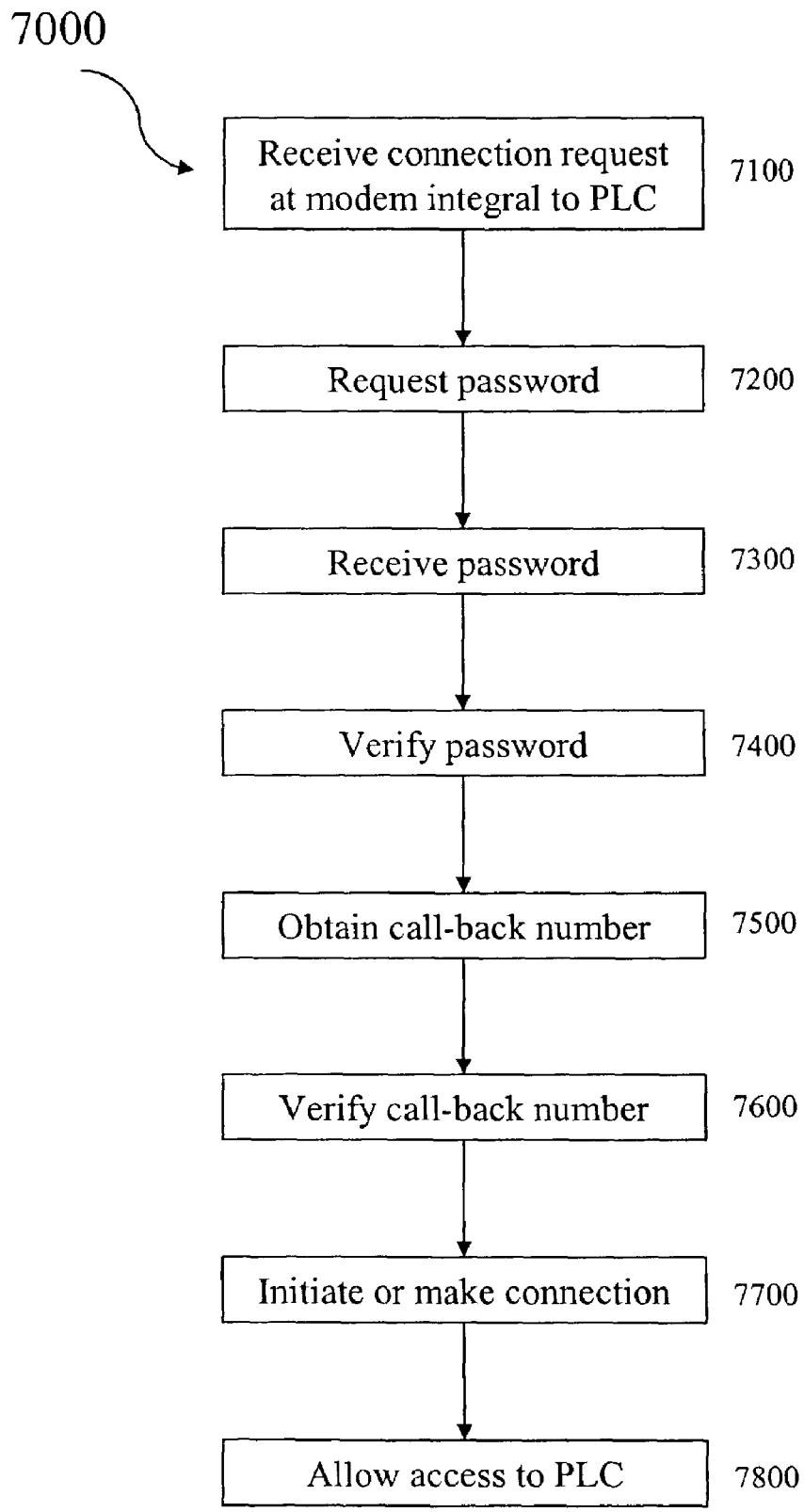
FIG. 7 is a flowchart of an exemplary embodiment of a method 7000 of the present invention.

FIG. 7 is a flowchart of an exemplary embodiment of a method 7000 of the present invention. At activity 7100, a connection request from a calling device can be received by a modem that is integral to a PLC. At activity 7200, the modem can request a username and/or password from the calling device. At activity 7300, the modem can receive a username and/or password. At activity 7400, the modem can verify the received username and/or password, and if verified, can acknowledge the verification.

At activity 7500, the modem can obtain a call-back telephone number from the calling device and/or from a storage device, such as a memory or a database. At activity 7600, the modem can verify the call-back number, perhaps by comparing a call-back number received from a calling device with a call-back number obtained from storage. At activity 7700, the modem can allow the connection, by establishing the connection, by placing a connection request, and/or by calling a pre-programmed call-back number. At activity 7800, the modem can allow the calling device to access the PLC.

Certain exemplary embodiments of the present invention include a modem module that allows a PLC to connect directly to an analog telephone line. Certain exemplary embodiments of the modem module are sometimes referred to herein as the EM 241 Modem module, and certain exemplary embodiments of the PLC are sometimes referred to herein as the S7-200.

Certain exemplary embodiments of the present invention can support communications between the PLC and a PLC programming tool, one exemplary embodiment of which is at times referred to herein as the STEP 7-Micro/WIN. Certain exemplary embodiments of the present invention include a modem module that supports the Modbus slave RTU protocol. Communications between the EM 241 Modem module and the PLC can be made over an Expansion I/O bus of the PLC.

The PLC programming tool can provide a software wizard to help set up a remote modem or a modem module for connecting a local PLC to a remote device.

Features of the EM 241 Modem Module

Figure 8:
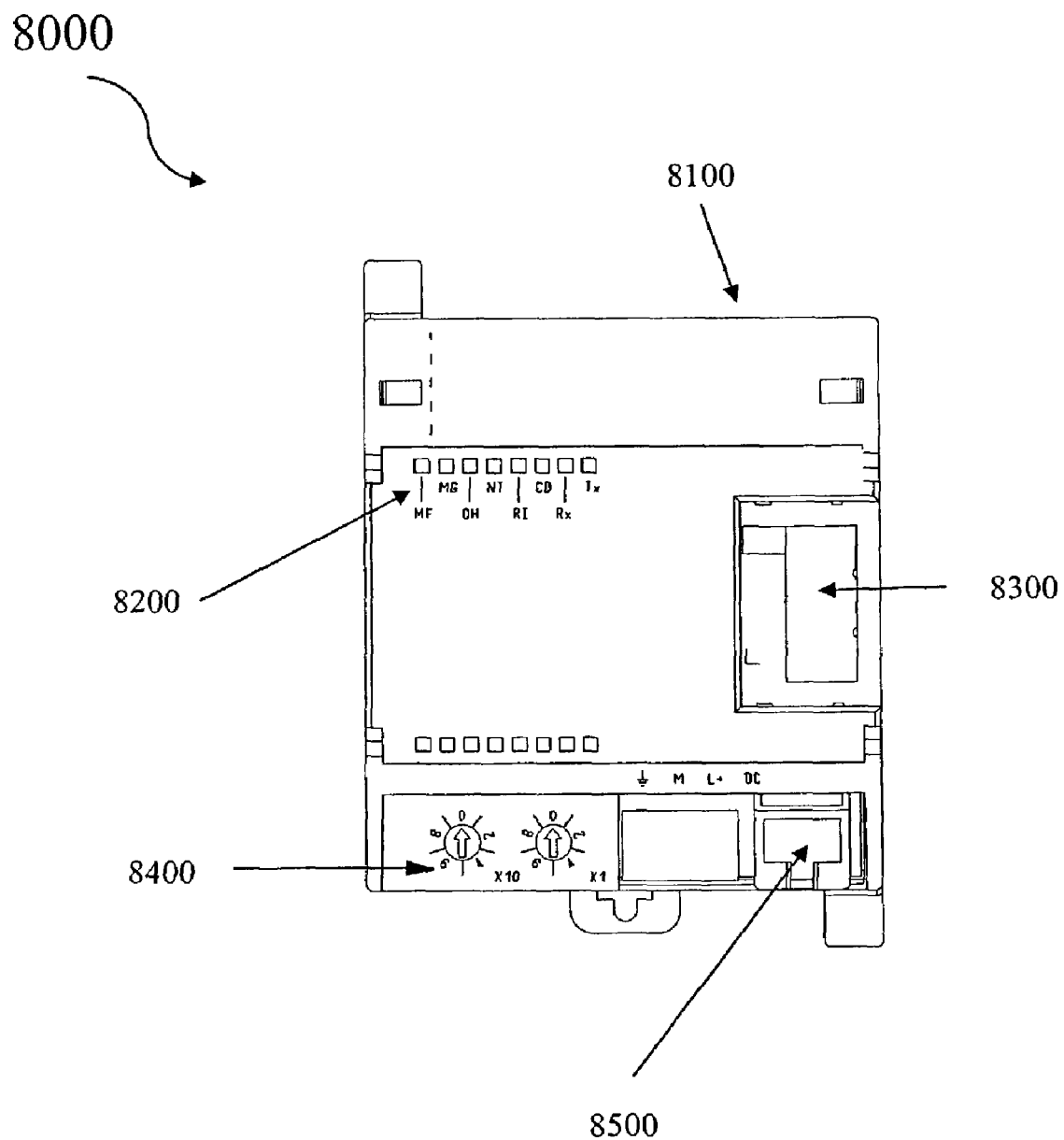
FIG. 8 is a top view of an exemplary EM 241 modem module 8000 of the present invention.

FIG. 8 is a top view of an exemplary EM 241 Modem module 8000, which can include a housing 8100, a series of indicator lights 8200, which can be used for displaying a status of module 8000; a connector 8300, which can be used for connecting the module to a PLC interface, such as an input/output expansion bus; one or more country code switches 8400, which can be used for configuring module 8000 for a particular country; and/or communications network interface 8500, such as an RJ11 jack. The one or more country code switches 8400 can be manually accessible, and can be coupled to firmware that reads a country code from at least one of switches 8400 and configures modem 8000 for country specific operation.

The following description applies to certain embodiments of EM 241 Modem module 8000, but should not be viewed as limiting.

The EM241 Modem Module can expand the functionality of the S7-200 Micro PLC into remote communications. Four Modes are supported by the Module:

(a) Mode 1 is for Micro/WIN programming and debugging. In certain embodiments, no setup is required. Instead, just Plug & Play.

(b) Mode 2 is for Modbus Master/Slave Communication.

(c) Mode 3 is for Alpha-Numeric Messaging and Numeric Paging.

(d) Mode 4 is for CPU-to-CPU Communications, such as between S7-200 Micro PLCs.

Moreover, the EM241 Modem Module can provide the following features:

(e) It can directly connect to the S7-200's Expansion I/O bus eliminating the need to tie up the CPU's communications port.

(t) Connection of an S7-200 PLC directly to an analog telephone line.

(g) Baud Rates can be self-negotiating dependent on Line Quality adjustable between 300 Baud and 33.6 kBaud (V.34bis).

(h) Provides international telephone line interface.

(i) Many country standards can be supported by the hardware rotary switches. All other settings can be stored in the PLC's variable memory.

(j) Pulse or Tone Dialing can be supported.

(k) A modem interface to STEP 7-Micro/WIN for programming and troubleshooting (teleservice).

(l) Support for the Modus RTU protocol.

(m) CPU-to-CPU or CPU-to-Modbus data transfer.

(n) Support for numeric and text paging.

(o) Support for SMS messaging.

(p) Support for Callback Function and/or Password Protection.

The EM 241 Modem module configuration can be stored in the CPU. The STEP 7-Micro/WIN Modem Expansion wizard can be used to configure the EM 241 Modem module.

International Telephone Line Interface

The EM 241 Modem module can be a standard V.34 (33.6 kBaud), 10-bit modem, and can be compatible with most internal and external PC modems.

The EM 241 Modem module can be connected to the telephone line with the six-position four-wire RJ11 connector mounted on the front of the module as shown in FIG. 8. When viewed from the front, RJ11 connector can be configured such that pin 3 provides Ring, and pin 4 provides Tip. Reverse connection can also be allowed.

In certain situations, an adapter can be used to convert the RJ11 connector for connection to the standard telephone line termination in the various countries.

The modem and telephone line interface can be powered from an external 24V DC supply. This power source can be connected to the CPU sensor supply or to an external power source. The ground terminal on the EM 241 Modem module can be connected to the system earth ground.

The EM 241 Modem module can automatically configure the telephone interface for country-specific operation when power is applied to the module. The two rotary switches on the front of the module select the country code. In some embodiments, the switches can be set to the desired country selection before the EM 241 Modem module is powered up as shown in Table 1.

TABLE 1

Countries Supported by the EM 241

| Switch Setting | Country |
| --- | --- |
| 01 | Austria |
| 02 | Belgium |
| 05 | Canada |
| 08 | Denmark |
| 09 | Finland |
| 10 | France |
| 11 | Germany |
| 12 | Greece |
| 16 | Ireland |
| 18 | Italy |
| 22 | Luxembourg |
| 25 | Netherlands |
| 27 | Norway |
| 30 | Portugal |
| 34 | Spain |
| 35 | Sweden |
| 36 | Switzerland |
| 38 | U.K. |
| 39 | U.S.A. |

STEP 7-Micro/WIN Interface

The EM 241 Modem module can allow communication with STEP 7-Micro/WIN over a telephone line (teleservice). It is not necessary to configure or program the S7-200 CPU to use the EM 241 Modem module as the remote modem when used with STEP 7-Micro/WIN.

The following steps can be followed to use the EM 241 Modem module with STEP 7-Micro/WIN:

(q) Remove the power from the S7-200 CPU and attach the EM 241 Modem module to the I/O expansion bus. Do not attach any I/O modules while the S7-200 CPU is powered up.

(r) Connect the telephone line to the EM 241 Modem module.

(s) Connect 24 volts DC to the EM 241 Modem module terminal blocks.

(t) Connect the EM 241 Modem module terminal block ground connection to the system ground.

(u) Set the country code switches.
(v) Power up the S7-200 CPU and the EM 241 Modem module.
(w) Configure STEP 7-Micro/WIN to communicate to a 10-bit modem.

Modbus RTU Protocol

The EM 241 Modem module can be configured to respond as a Modbus RTU slave. In this situation, the EM 241 Modem module receives Modbus requests over the modem interface, interprets those requests, and transfers data to or from the CPU. The EM 241 Modem module then generates a Modbus response and transmits it out over the modem interface.

In certain embodiments, if the EM 241 Modem module is configured to respond as a Modbus RTU slave, STEP 7-Micro/WIN is not able to communicate to the EM 241 Modem module over the telephone line.

The EM 241 Modem module can support the Modbus functions shown in Table 2.

TABLE 2

Modbus Functions Supported by Modem Module

| Function | Description |
| --- | --- |
| Function 01 | Read coil (output) status |
| Function 02 | Read input status |
| Function 03 | Read holding registers |
| Function 04 | Read input (analog input) registers |
| Function 05 | Write single coil (output) |
| Function 06 | Preset single register |
| Function 15 | Write multiple coils (outputs) |
| Function 16 | Preset multiple registers |

Modbus functions 4 and 16 can allow reading or writing a maximum of 125 holding registers (250 bytes of V memory) in one request. Functions 5 and 15 can write to the output image register of the CPU. These values can be overwritten by a user program.

Modbus addresses can be written as 5 or 6 character values containing the data type and the offset. In this situation, the first one or two characters can determine the data type, and the last four characters can select the proper value within the data type. The Modbus master device can map the addresses to the correct Modbus functions.

Table 3 shows the Modbus addresses supported by the EM 241 Modem module, and the mapping of Modbus addresses to the S7-200 CPU addresses.

TABLE 3

Mapping Modbus Addresses to the S7-200 CPU

| Modbus Address | S7-200 CPU Address |
| --- | --- |
| 000001 | Q0.0 |
| 000002 | Q0.1 |
| 000003 | Q0.2 |
| . . . | . . . |
| 000127 | Q15.6 |
| 000128 | Q15.7 |
| 010001 | I0.0 |
| 010002 | I0.1 |
| 010003 | I0.2 |
| . . . | . . . |
| 010127 | I15.6 |
| 010128 | I15.7 |
| 030001 | AIW0 |
| 030002 | AIW2 |
| 030003 | AIW4 |

TABLE 3-continued

Mapping Modbus Addresses to the S7-200 CPU

| Modbus Address | S7-200 CPU Address |
| --- | --- |
| . . . | . . . |
| 030032 | AIW62 |
| 040001 | VW0 |
| 040002 | VW2 |
| 040003 | VW4 |
| . . . | . . . |
| 04xxxx | VW 2*(xxxx-1) |

The Modem Expansion wizard can be used to create a configuration block in the EM 241 module to support Modbus RTU protocol. The EM 241 Modem module configuration block can be downloaded to the CPU data block before use of the Modbus protocol.

Paging and SMS Messaging

The EM 241 Modem module can support sending numeric and text paging messages, and SMS (Short Message Service) messages to cellular phones (where supported by the cellular provider). The messages and telephone numbers can be stored in the EM 241 modem module configuration block which can be downloaded to the data block in the S7-200 CPU.

The Modem Expansion wizard can be used to create the messages and telephone numbers for the EM 241 Modem module configuration block. The Modem Expansion wizard also can create the program code to allow a program to initiate the sending of the messages.

Numeric Paging

Numeric paging can use the tones of a touch tone telephone to send numeric values to a pager. The EM 241 Modem module can dial the requested paging service, wait for the voice message to complete, and send the tones corresponding to the digits in the paging message. The digits 0 through 9, asterisk (*), A, B, C and D can be allowed in the paging message. The actual characters displayed by a pager for the asterisk and A, B, C, and D characters can be determined by the pager and the paging service provider.

Text Paging

Text paging can allow alphanumeric messages to be transmitted to a paging service provider, and from there to a pager. Text paging providers normally have a modem line that accepts text pages. The EM 241 Modem module can use Telelocator Alphanumeric Protocol (TAP) to transmit the text messages to the service provider. Many providers of text paging use this protocol to accept messages.

Short Message Service (SMS)

Short Message Service (SMS) messaging is supported by some cellular telephone services, including those that are GSM compatible. SMS can allow the EM 241 Modem module to send a message over an analog telephone line to an SMS provider. The SMS provider can then transmit the message to the cellular telephone, and the message can appear on the text display of the telephone. The EM 241 Modem module can use the Telelocator Alphanumeric Protocol (TAP) and/or the Universal Computer Protocol (UCP) to send messages to the SMS provider.

Embedded Variables in Text and SMS Messages

The EM 241 Modem module can embed data values from the CPU in the text messages and can format the data values based on a specification in the message. A user can specify the number of digits to the left and right of the decimal point, and whether the decimal point is a period or a comma. When the user program commands the EM 241 Modem module to transmit a text message, the EM 241 Modem module can retrieve the message from the CPU, determine what CPU values are needed within the message, retrieve those values from the CPU, and/or format and place the values within the text message before transmitting the message to the service provider.

The telephone number of the messaging provider, the message, and the variables embedded within the message can be read from the CPU over multiple CPU scan cycles. The variables embedded within a message can continue to be updated during the sending of a message. If a message contains multiple variables, those variables can be read over multiple scan cycles of the CPU.

Data Transfers

The EM 241 Modem module can allow a user program to transfer data to another CPU or to a Modbus device over the telephone line. The data transfers and telephone numbers can be configured with the Modem Expansion wizard, and can be stored in the EM 241 Modem module configuration block. The configuration block can be downloaded to the data block in the S7-200 CPU. The Modem Expansion wizard also can create program code to allow a user program to initiate the data transfers.

A data transfer can be either a request to read data from a remote device, or a request to write data to a remote device. A data transfer can read or write between 1 and 100 words of data. Data transfers can move data to or from the V memory of the attached CPU.

The Modem Expansion wizard can allow a user to create a data transfer consisting of a single read from the remote device, a single write to the remote device, or both a read from and a write to the remote device.

Data transfers can use the configured protocol of the EM 241 Modem module. If the EM 241 Modem module is configured to support PPI protocol (where it responds to STEP 7-Micro/WIN), the EM 241 Modem module can use the PPI protocol to transfer data. If the EM 241 Modem module is configured to support the Modbus RTU protocol, data transfers can be transmitted using the Modbus protocol.

The telephone number of the remote device, the data transfer request, and the data being transferred can be read from the CPU over multiple CPU scan cycles. Generally, a user program does not modify telephone numbers or messages while a message is being sent, or modify the data being transferred while a message is being sent.

If the remote device is another Modem module, the password function can be used by the data transfers by entering the password of the remote Modem module in the telephone number configuration.

Password Protection

The password security of the EM 241 Modem module can be optional and can be enabled with the Modem Expansion wizard. In certain embodiments, the password used by the EM 241 Modem module is not the same as the CPU password. Instead, the EM 241 Modem module password can be a separate password containing, for example, 8-characters, that the caller can supply to the EM 241 Modem module before being allowed access to the attached CPU. The password can be stored in the V memory of the CPU as part of the EM 241 Modem module configuration block. The EM 241 Modem module configuration block can be downloaded to the data block of the attached CPU.

If the CPU has the password security enabled in the System Data Block, the caller can supply the CPU password to gain access to password protected functions.

Security Callback

The callback function of the EM 241 Modem module can be optional and can be configured with the Modem Expansion wizard. The callback function can provide additional security for the attached CPU by allowing access to the CPU only from predefined telephone numbers. When the callback function is enabled, the EM 241 Modem module can answer any incoming calls, verify the caller, and then disconnect the line. If the caller is authorized, the EM 241 Modem module then can dial a predefined telephone number for the caller, and allow access to the CPU.

The EM 241 Modem module can support three callback modes:

(a) Callback to a single predefined telephone number
(b) Callback to multiple predefined telephone numbers
(c) Callback to any telephone number.

The callback mode can be selected by checking the appropriate option in the Modem Expansion wizard and then defining the callback telephone numbers. The callback telephone numbers can be stored in the EM 241 Modem module configuration block stored in the data block of the attached CPU.

The simplest form of callback is to a single predefined telephone number. If only one callback number is stored in the EM 241 Modem module configuration block, whenever the EM 241 Modem module answers an incoming call, it can notify the caller that callback is enabled, disconnect the caller, and dial the callback number specified in the configuration block.

The EM 241 Modem module can also support callback for multiple predefined telephone numbers. In this mode, the caller can be asked for a telephone number. If the supplied number matches one of the predefined telephone numbers in the EM 241 Modem module configuration block, the EM 241 Modem module can disconnect the caller, and call back using the matching telephone number from the configuration block. The user can configure up to 250 callback numbers.

Where there are multiple predefined callback numbers, numerous schemes are possible. In certain embodiments, the callback number supplied when connecting to the EM 241 Modem module is an exact match of the number in the configuration block of the EM 241 Modem module except for the first two digits. For example, if the configured callback is 91(123)4569999 because of a need to dial an outside line (9) and long distance (1), the number supplied for the callback could be any of the following:

(a) 91(123)4569999
(b) 1(123)4569999
(c) (123)4569999

All of the above telephone number can be considered to be a callback match. The EM 241 Modem module can use the callback telephone number from its configuration block when performing the callback, in this example 91(123) 4569999. In certain embodiments, only the numeric characters in a telephone number are used when comparing callback numbers. Characters such as commas or parenthesis can be ignored when comparing callback numbers.

The callback to any telephone number can be set up in the Modem Expansion wizard by selecting the "Enable callbacks to any phone number" option during the callback configuration. If this option is selected, the EM 241 Modem module can answer an incoming call and request a callback telephone number. After the telephone number is supplied by the caller, the EM 241 Modem module can disconnect and dial that telephone number. This callback mode can provide a means to allow telephone charges to be billed to the EM 241 Modem module's telephone connection and does not necessarily provide security for the S7-200 CPU. The EM 241 Modem module password can be used for security if this callback mode is used.

The EM 241 Modem module password and callback functions can be enabled at the same time. The EM 241 Modem module can requires a caller to supply the correct password before handling the callback.

Configuration Table for the EM 241 Modem Module

All of the text messages, telephone numbers, data transfer information, callback numbers and other options can be stored in a Modem module configuration table which can be loaded into the V memory of the S7-200 CPU. The Modem Expansion wizard can guide a user through the creation of a Modem module configuration table. STEP 7-Micro/WIN then can place the EM 241 Modem module configuration table in the Data Block which can be downloaded to the S7-200 CPU.

The EM 241 Modem module can read this configuration table from the CPU on startup and within five seconds of any STOP-to-RUN transition of the CPU. The EM 241 Modem module does not necessarily read a new configuration table from the CPU as long the EM 241 Modem module is online with STEP 7-Micro/WIN. If a new configuration table is downloaded while the EM 241 Modem module is online, the EM 241 Modem module can read the new configuration table when the online session is ended.

If the EM 241 Modem module detects an error in the configuration table, the Module Good (MG) LED on the front of the module can flash on and off. A user can check the PLC Information screen in STEP 7-Micro/WIN, or read the value in SMW220 (for module slot 0) for information about the configuration error. The EM 241 Modem module configuration errors are listed in Table 4. If a user utilizes the Modem Expansion wizard to create the EM 241 Modem module configuration table, STEP 7-Micro/WIN can check the data before creating the configuration table.

TABLE 4

EM 241 Configuration Errors (Hexadecimal)

| Error | Description |
|---|---|
| 0000 | No error |
| 0001 | No 24 VDC external power |
| 0002 | Modem failure |
| 0003 | No configuration block ID-The EM 241 identification at the start of the configuration table is not valid for this module. |
| 0004 | Configuration block out of range-The configuration table pointer does not point to V memory, or some part of the table is outside the range of V memory for the attached CPU. |
| 0005 | Configuration error-Callback is enabled and the number of callback telephone numbers equals 0 or it is greater than 250. The number of messages is greater than 250. The number of messaging telephone numbers is greater than 250, or if length of the messaging telephone numbers is greater than 120 bytes. |
| 0006 | Country selection error-The country selection on the two rotary switches is not a supported value. |
| 0007 | Phone number too large-Callback is enabled and the callback number length is greater than the maximum. |
| 0008 to 00FF | Reserved |
| 01xx | Error in callback number xx-There are illegal characters in callback telephone number xx. The value xx is 1 for the first callback number, 2 for the second, etc. |
| 02xx | Error in telephone number xx-One of the fields in a message telephone number xx or a data transfer telephone number xx contains an illegal value. The value xx is 1 for the first telephone number, 2 for the second, etc. |
| 03xx | Error in message xx-Message or data transfer number xx exceeds the maximum length. The value xx is 1 for the first message, 2 for the second, etc. |
| 0400 to FFFF | Reserved |

Status LEDs of the EM 241 Modem Module

The EM 241 Modem module can have 8 status LEDs on the front panel. Table 5 describes the status LEDs.

TABLE 5

EM 241 Status LEDs

| LED | Description |
|---|---|
| MF | Module Fail-This LED is on when the module detects a fault condition such as:<br>H No 24 VDC external power<br>H Timeout of the I/O watchdog<br>H Modem failure<br>H Communications error with the local CPU |
| MG | Module Good-This LED is on when there is no module fault condition. The Module Good LED flashes if there is a error in the configuration table, or the user has selected an illegal country setting for the telephone line interface. Check the PLC Information screen in STEP 7-Micro/WIN or read the value in SMW220 (for module slot 0) for information about the configuration error. |
| OH | Off Hook-This LED is on when the EM 241 is actively using the telephone line. |

TABLE 5-continued

EM 241 Status LEDs

| LED | Description |
|---|---|
| NT | No Dial Tone-This LED indicates an error condition and turns on when the EM 241 has been commanded to send a message and there is no dial tone on the telephone line. This is only an error condition if the EM 241 has been configured to check for a dial tone before dialing. The LED remains on for approximately 5 seconds after a failed dial attempt. |
| RI | Ring Indicator-This LED indicates that the EM 241 is receiving an incoming call. |
| CD | Carrier Detect-This LED indicates that a connection has been established with a remote modem. |
| Rx | Receive Data-This LED flashes on when the modem is receiving data. |
| Tx | Transmit Data-This LED flashes on when the modem is transmitting data. |

Using the Modem Expansion Wizard to Configure the EM 241 Modem Module

A user can start the Modem Expansion wizard from the STEP 7-Micro/WIN Tools menu or from the Tools portion of the Navigation Bar.

To use this wizard, the user's project is typically compiled and set to Symbolic Addressing Mode. On first screen of the Modem Expansion wizard, a user can select Configure an EM 241 Modem module and click Next>.

The Modem Expansion wizard can acquire the EM 241 Modem module's position relative to the S7-200 CPU in order to generate the correct program code. A user can click the Read Modules button to automatically read the positions of the intelligent modules attached to the CPU. Expansion modules can be numbered sequentially starting at zero. A user can double-click the EM 241 Modem module to configure, or set the Module Position field to the position of the EM 241 Modem module.

The password protection screen allows a user to enable password protection for the EM 241 Modem module and/or to assign a 1 to 8 character password for the module. This password can be independent of the S7-200 CPU password. When the module is password-protected, anyone who attempts to connect with the S7-200 CPU through the EM 241 Modem module can be required to supply the correct password. A user can select password protection if desired, and enter a password.

The EM 241 Modem module can support two communications protocols: PPI protocol (to communicate with STEP 7-Micro/WIN), and Modbus RTU protocol. Protocol selection can be dependent on the type of device that is being used as the remote communications partner. This setting can control the communications protocol used when the EM 241 Modem module answers a call and also when the EM 241 Modem module initiates a CPU data transfer.

A user can configure the module to send numeric and text messages to pagers, or Short Message Service (SMS) messages to cellular telephones. A user can check the Enable messaging checkbox and click the Configure Messaging . . . button to define messages and the recipient's telephone numbers.

When setting up a message to be sent to a pager or cellular phone, a user can define the message and the telephone number. A user can select the Messages tab on the Configure Messaging screen and click the New Message button. A user then can enter the text for the message and specify any CPU data values to insert into the message. To insert a CPU data value into the message, a user can move the cursor to the position for the data and click the Insert Data . . . button. A user can specify the address of the CPU data value (i.e. VW100), the display format (i.e. Signed Integer) and the digits left and right of the decimal point. A user also can specify if the decimal point should be a comma or a period.

Numeric paging messages can be limited to the digits 0 to 9, the letters A, B, C and D, and the asterisk (*). The maximum allowed length of a numeric paging message can vary by service provider. Text messages can be up to 119 characters in length and contain any alphanumeric character. Text messages can contain any number of embedded variables.

Embedded variables can be from V, M, SM, I, Q, S, T, C or AI memory in the attached CPU. Hexadecimal data can be displayed with a leading '6#'. The number of characters in the value can be based on the size of the variable. For example, VW100 displays as 16#0123. The number of digits left of the decimal can be large enough to display the expected range of values, including the negative sign, if the data value is a signed integer or floating point value. If the data format is integer and the number of digits right of the decimal point is not zero, the integer value can be displayed as a scaled integer. For example, if VW100=1234 and there are 2 digits right of the decimal point, the data is displayed as '12.34'. If the data value is greater than can be displayed in the specified field size, the EM 241 Modem module can place the # character in all character positions of data value.

Telephone numbers can be configured by selecting the Phone Numbers tab on the Configure Messaging screen. A user can click the New Phone Number . . . button to add a new telephone number. Once a telephone number has been configured it can be added to the project. A user can highlight the telephone number in the Available Phone Numbers column and click the right arrow box to add the telephone number to the current project. Once a user has added the telephone number to the current project, the user can select the telephone number and add a symbolic name for this number to use in the user's program. The telephone number can consists of several fields which can vary based on the type of messaging selected by the user.

The Messaging Protocol selection can tell the EM 241 Modem module which protocol to use when sending the message to the message service provider. Numeric pagers can support only numeric protocol. Text paging services can usually require TAP (Telelocator Alphanumeric Protocol). SMS messaging providers can be supported with either TAP or UCP (Universal Computer Protocol). There are three different UCP services normally used for SMS messaging. Most providers support command 1 or 51. A user can check with the SMS provider to determine the protocol and commands required by that provider.

The Description field can allow a user to add a text description for the telephone number. The Phone Number field can be the telephone number of the messaging service provider. For text messages this can be the telephone number of the modem line the service provider uses to accept text messages. For numeric paging this can be the telephone number of the pager itself. The EM 241 Modem module can allow the telephone number field to be a maximum of 40 characters. The following characters can be allowed in telephone numbers that the EM 241 Modem module can use to dial out:

| | |
|---|---|
| 0 to 9 | allowed from a telephone keypad |
| A, B, C, D, *, # | DTMF digits (tone dialing only) |
| , | pause dialing for 2 seconds |
| ! | generate a hook flash |
| @ | wait for 5 seconds of silence |
| W | wait for a dial tone before continuing |
| ( ) | ignored (can be used to format the telephone number) |

The Specific Pager ID or Cell Phone Number field is where a user can enter the pager number or cellular telephone number of the message recipient. Up to 20 characters can be included. The Password field can be optional for TAP message. Some providers can require a password but normally this field can be left blank. The EM 241 Modem module can allow the password to be up to 15 characters.

The Originating Phone Number field can allow the EM 241 Modem module to be identified in the SMS message. This field can be required by some service providers which use UCP commands. Some service providers can require a minimum number of characters in this field. The EM 241 Modem module can allow up to 15 characters.

The Modem Standard field can be provided for use in cases where the EM 241 Modem module and the service provider modem cannot negotiate the modem standard. The default can be V.34 (33.6 kbaud).

The Data Format fields can allow a user to adjust the data bits and parity used by the modem when transmitting a message to a service provider. TAP can normally use 7 data bits and even parity, but some service providers can use 8 data bits and no parity. UCP can use 8 data bits with no parity. A user can check with the service provider to determine which settings to use.

A user can configure the EM 241 Modem module to transfer data to another S7-200 CPU (if PPI protocol was selected) or to transfer data to a Modbus device (if Modbus protocol was selected). A user can check the Enable CPU data transfers checkbox and click the Configure CPU-to . . . button to define the data transfers and the telephone numbers of the remote devices.

When setting up a CPU-to-CPU or a CPU-to-Modbus data transfer a user can define the data to transfer and the telephone number of the remote device. To do so, a user can select the Data Transfers tab on the Configure Data Transfers screen and click the New Transfer button. A data transfer can consists of a data read from the remote device, a data write to the remote device, or both a read from and a write to the remote device. If both a read and a write are selected, the read can be performed first and then the write.

Up to 100 words can be transferred in each read or write. Data transfers can be to or from the V Memory in the local CPU. The wizard can describe the memory locations in the remote device as if the remote device is an S7-200 CPU. If the remote device is a Modbus device, the transfer can be to or from holding registers in the Modbus device (address 04xxxx). The equivalent Modbus address (xxxx) can be determined as follows:

Modbus address=1+(V memory address/2)
V memory address=(Modbus address−1)*2

The Phone Numbers tab on the Configure CPU Data Transfers screen can allow a user to define the telephone numbers for CPU-to-CPU or a CPU-to-Modbus data transfers. A user can click the New Phone Number . . . button to add a new telephone number. Once a telephone number has been configured it can be added to the project. A user can highlight the telephone number in the Available Phone Numbers column and click the right arrow box to add the telephone number to the current project. Once a user has added the telephone number to the current project, the user can select the telephone number and add a symbolic name for this telephone number to use in the user's program.

The Description and Phone Number fields are the same as described earlier for messaging. The Password field can be required if the remote device is a Modem module and password protection has been enabled. The Password field in the local Modem module can be set to the password of the remote Modem module. The local Modem module can supply this password when it is requested by the remote Modem module.

Callback can cause the EM 241 Modem module to automatically disconnect and dial a predefined telephone number after receiving an incoming call from a remote STEP 7-Micro/WIN. A user can select the Enable callback checkbox and click the Configure Callback . . . button to configure callback telephone numbers.

The Configure Callback . . . screen can allow a user to enter the telephone numbers the EM 241 Modem module uses when it answers an incoming call. A user can check the 'Enable callbacks to only specified phone numbers' if the callback numbers are to be predefined. If the EM 241 Modem module is to accept any callback number supplied by the incoming caller (to reverse the connection charges), a user can check the 'Enable callbacks to any phone number' selection.

If only specified callback telephone numbers are allowed, a user can click the New Phone Number button to add callback telephone numbers. The Callback Properties screen allows a user to enter the predefined callback telephone numbers and a description for the callback number. The callback number entered here can be the telephone number that the EM 241 Modem module uses to dial when performing the callback. This telephone number can include all digits required to connect to an outside line, pause while waiting for an outside line, connect to long distance, etc.

After entering a new callback telephone number, it can be added to the project. A user can highlight the telephone number in the Available Callback Phone Numbers column and click the right arrow box to add the telephone number to the current project.

A user can set the number of dialing attempts that the EM 241 Modem module makes when sending a message or during a data transfer. In certain embodiments, the EM 241 Modem module can report an error to the user program only when all attempts to dial and send the message are unsuccessful.

Some telephone lines do not have a dial tone present when the telephone receiver is lifted. The EM 241 Modem module can returns an error to the user program if a dial tone is not present when the EM 241 Modem module is commanded to send a message or perform a callback. To allow dialing out on a line with no dial tone, a user can check the box, Enable Dialing Without Dial Tone Selection.

The Modem Expansion wizard can create a configuration block for the EM 241 Modem module and can require the user to enter the starting memory address where the EM 241 Modem module configuration data is stored. The EM 241

Modem module configuration block can be stored in V Memory in the CPU. STEP 7-Micro/WIN can write the configuration block to the project Data Block. The size of the configuration block can vary based on the number of messages and telephone numbers configured. A user can select the V Memory address where the configuration block is to be stored, or click the Suggest Address button if the user wants the wizard to suggest the address of an unused V Memory block of the correct size.

A final step in configuring the EM 241 Modem module can be to specify the Q memory address of the command byte for the EM 241 Modem module. A user can determine the Q memory address by counting the output bytes used by any modules with discrete outputs installed on the S7-200 before the EM 241 Modem module.

The Modem Expansion wizard can generate the project components for a user's selected configuration (program block and data block) and make that code available for use by the user's program. The final wizard screen can display the user's requested configuration project components. The user can download the EM 241 Modem module configuration block (Data Block) and the Program Block to the S7-200 CPU.

Modem Instructions and Restrictions

The Modem Expansion wizard can make controlling the EM 241 Modem module easier by creating unique instruction subroutines based on the position of the module and configuration options selected by a user. Each instruction can be prefixed with a "MODx_" where x is the module location.

Using the EM 241 Modem Module Instructions

Consider these guidelines when you use Modem module instructions:

(a) The EM 241 Modem module instructions can use three subroutines.
(b) The EM 241 Modem module instructions can increase the amount of memory required for a user's program by up to 370 bytes. If a user deletes an unused instruction subroutine, the user can rerun the Modem Expansion wizard to recreate the instruction if needed.
(c) Typically, only one instruction should be active at a time.
(d) Typically, the instructions are not used in an interrupt routine.
(e) The EM 241 Modem module can read the configuration table information when it first powers up and after a STOP-to-RUN transition. In certain embodiments, any change that the user program makes to the configuration table is not seen by the module until a mode change or the next power cycle.

Using the EM 241 Modem Module Instructions

A user can utilize the EM 241 Modem module instructions in the user's S7-200 program, by completing the following steps:

a. Use the Modem Expansion wizard to create the EM 241 Modem module configuration table.
b. Insert the MODx_CTRL instruction in the program and use the SM0.0 contact to execute it every scan.
c. Insert a MODx_MSG instruction for each message needed to be sent.
d. Insert a MODx_XFR instruction for each data transfer.

Instructions for the EM 241 Modem Module

MODx_CTRL Instruction

Figure 9:
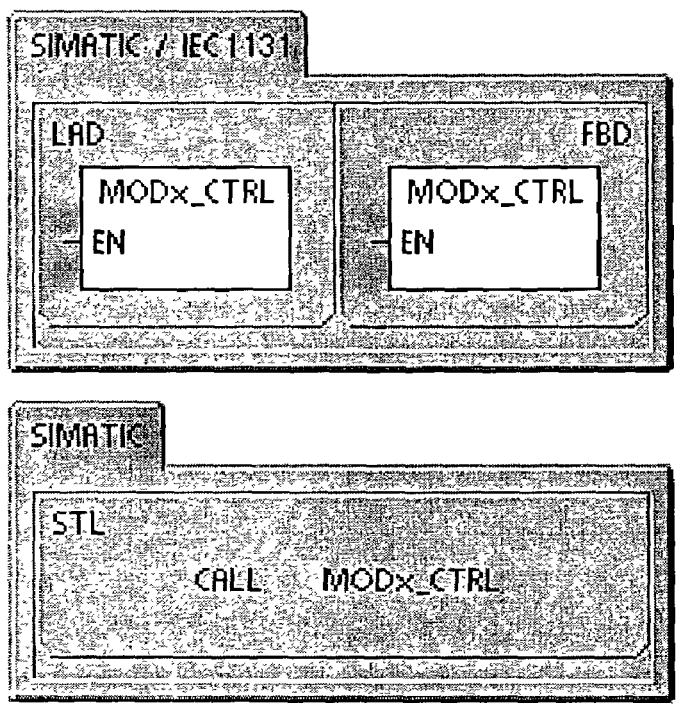
FIG. 9 is a screen shot of exemplary graphical user interfaces 9000 of the present invention.

MODx_CTRL (Control) instruction can be used to enable and initialize the EM 241 Modem module. This instruction can be called every scan and, in certain embodiments, is used once in the project. FIG. 9 is a screen shot of graphical user interfaces 9000 that display certain MODx_CTRL instructions.

MODx_XFR Instruction

Figure 10:
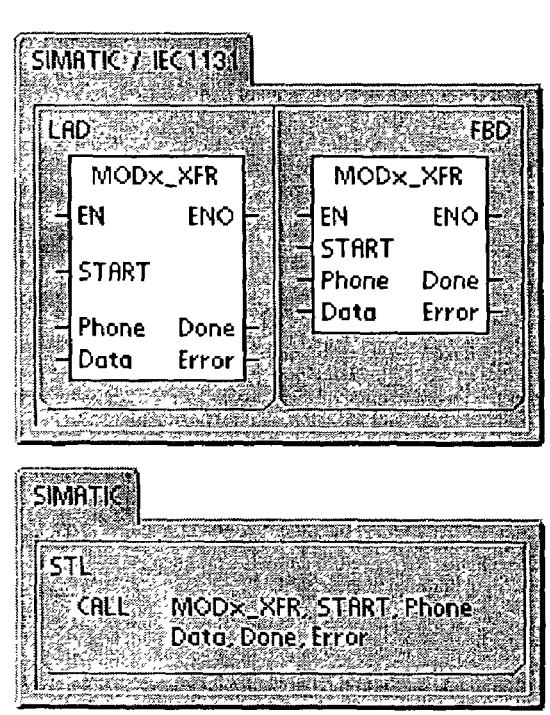
FIG. 10 is a screen shot of exemplary graphical user interfaces 10000 of the present invention.

MODx_XFR (Data Transfer) instruction can be used to command the EM 241 Modem module to read and write data to another S7-200 CPU or a Modbus device. In certain embodiments, this instruction can take 20 to 30 seconds from the time the START input is triggered until the Done bit is set. FIG. 10 is a screen shot of graphical user interfaces 10000 that display certain MODx_XFR instructions.

The EN bit can be on to enable a command to the module, and can remain on until the Done bit is set, signaling completion of the process. An XFR command can be sent to the EM 241 Modem module on each scan when START input is on and the module is not currently busy. The START input can be pulsed on through an edge detection element, which only allows one command to be sent.

Phone can be the number of one of the data transfer telephone numbers. A user can utilize the symbolic name assigned to each data transfer telephone number when the number was defined with the Modem Expansion wizard.

Data can be the number of one of the defined data transfers. A user can use the symbolic name assigned to the data transfer when the request was defined using the Modem Expansion wizard.

Done can be a bit that comes on when the EM 241 Modem module completes the data transfer.

Error can be a byte that contains the result of the data transfer. Table 6 lists a number of possible error conditions that could result from executing this instruction.

TABLE 6

Parameters for the MODx_XFR Instruction

| Inputs/Outputs | Data Type | Operands |
|---|---|---|
| START | BOOL | I, Q, M, S, SM, T, C, V, L, Power Flow |
| Phone, Data | BYTE | VB, IB, QB, MB, SB, SMB, LB, AC, Constant, *VD, *AC, *LD |
| Done | BOOL | I, Q, M, S, SM, T, C, V, L |
| Error | BYTE | VB, IB, QB, MB, SB, SMB, LB, AC, *VD, *AC, *LD |

MODx_MSG Instruction

Figure 11:
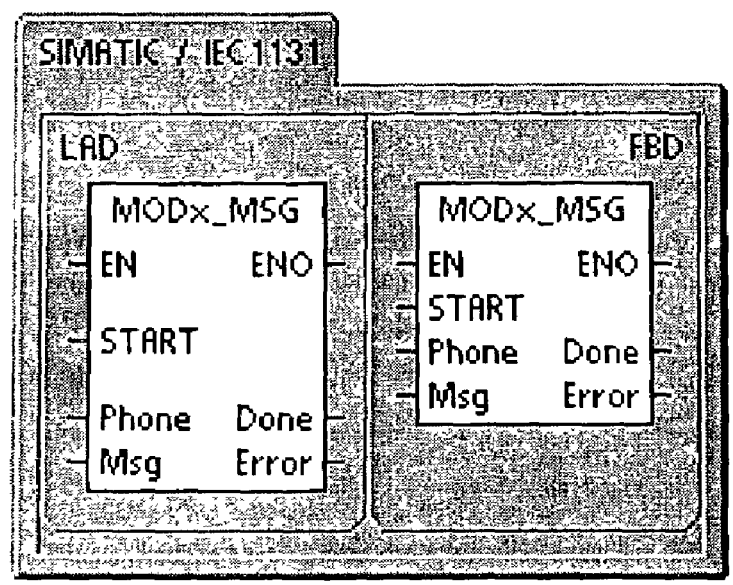
FIG. 11 is a screen shot of exemplary graphical user interfaces 11000 of the present invention.
Figure 11:
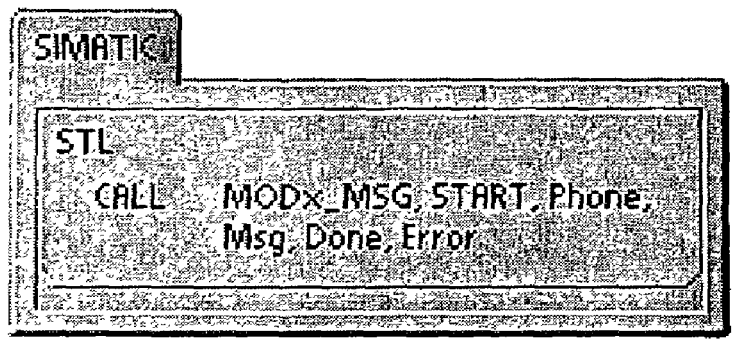

The MODx_MSG (Send Message) instruction can be used to send a paging or SMS message from Modem module. In certain embodiments, this instruction can take 20 to 30 seconds from the time the START input is triggered until the Done bit is set. FIG. 11 is a screen shot of graphical user interfaces 11000 that display certain MODx_MSG instructions. Table 7 provides various parameter for the MODx-MSG instruction.

TABLE 7

Parameters for the MODx_MSG Instruction

| Inputs/Outputs | Data Type | Operands |
|---|---|---|
| START | BOOL | I, Q, M, S, SM, T, C, V, L, Power Flow |
| Phone, Msg | BYTE | VB, IB, QB, MB, SB, SMB, LB, AC, Constant, *VD, *AC, *LD |
| Done | BOOL | I, Q, M, S, SM, T, C, V, L |
| Error | BYTE | VB, IB, QB, MB, SB, SMB, LB, AC, *VD, *AC *LD |

The EN bit is typically on to enable a command to the module, and can remain on until the Done bit is set, signaling completion of the process. A MSG command can be sent to the EM 241 Modem module on each scan when START input is on and the module is not currently busy. The START input can be pulsed on through an edge detection element, which only allows one command to be sent.

Phone can be the number of one of the message telephone numbers. A user can use the symbolic name assigned to each message telephone number the when the number was defined with the Modem Expansion wizard.

Msg can be the number of one of the defined messages. A user can use the symbolic name assigned to the message when the message was defined using the Modem Expansion wizard.

Done can be a bit that comes on when the EM 241 Modem module completes the sending of the message to the service provider.

Error can be a byte that contains the result of this request to the module. Table 8 defines a number of possible error conditions that could result from executing this instruction.

TABLE 8

Error Values Returned by MODx_MSG and MODx_XFR Instructions

| Error | Description |
|---|---|
| 0 | No error |
| *Telephone line errors* | |
| 1 | No dial tone present |
| 2 | Busy line |
| 3 | Dialing error |
| 4 | No answer |
| 5 | Connect timeout (no connection within 1 minute) |
| 6 | Connection aborted or an unknown response |
| *Errors in the command* | |
| 7 | Numeric paging message contains illegal digits |
| 8 | Telephone number (Phone input) out of range |
| 9 | Message or data transfer (Msg or Data input) out of range |
| 10 | Error in text message or data transfer message |
| 11 | Error in messaging or data transfer telephone number |
| 12 | Operation not allowed (i.e. attempts set to zero) |
| *Service provider errors* | |
| 13 | No response (timeout) from messaging service |
| 14 | Message service disconnected for unknown reason |
| 15 | User aborted message (disabled command bit) |
| *TAP-Text paging and SMS message errors returned by service provider* | |
| 16 | Remote disconnect received (service provider aborted session) |
| 17 | Login not accepted by message service (incorrect password) |
| 18 | Block not accepted by message service (checksum or transmission error) |
| 19 | Block not accepted by message service (unknown reason) |
| *UCP-SMS message errors returned by service provider* | |
| 20 | Unknown error |
| 21 | Checksum error |

TABLE 8-continued

Error Values Returned by MODx_MSG and MODx_XFR Instructions

| Error | Description |
|---|---|
| 22 | Syntax error |
| 23 | Operation not supported by system (illegal command) |
| 24 | Operation not allowed at this time |
| 25 | Call barring active (blacklist) |
| 26 | Caller address invalid |
| 27 | Authentication failure |
| 28 | Legitimization code failure |
| 29 | GA not valid |
| 30 | Repetition not allowed |
| 31 | Legitimization code for repetition, failure |
| 32 | Priority call not allowed |
| 33 | Legitimization code for priority call, failure |
| 34 | Urgent message not allowed |
| 35 | Legitimization code for urgent message, failure |
| 36 | Reverse charging not allowed |
| 37 | Legitimization code for reverse charging, failure |
| 38 | Deferred delivery not allowed |
| 39 | New AC not valid |
| 40 | New legitimization code not allowed |
| 41 | Standard text not valid |
| 42 | Time period not valid |
| 43 | Message type not supported by system |
| 44 | Message too long |
| 45 | Requested standard text not valid |
| 46 | Message type not valid for pager type |
| 47 | Message not found in SMSC |
| 48 | Reserved |
| 49 | Reserved |
| 50 | Subscriber hang up |
| 51 | Fax group not supported |
| 52 | Fax message type not supported |
| *Data transfer errrors* | |
| 53 | Message timeout (no response from remote device) |
| 54 | Remote CPU busy with upload or download |
| 55 | Access error (memory out of range, illegal data type) |
| 56 | Communications error (unknown response) |
| 57 | Checksum or CRC error in response |
| 58 | Remote EM 241 set for callback (not allowed) |
| 59 | Remote EM 241 rejected the provided password |
| 60 to 127 | Reserved |
| *Instruction use errors* | |
| 128 | Cannot process this request. Either the Modem module is busy with another request, or there was no START pulse on this request. |
| 129 | Modem module error: |
| H | The location of the Modem module or the Q memory address that was configured with the Modem Expansion wizard does not match the actual location or memory address |
| H | Refer to SMB8 to SMB21 (I/O Module ID and Error Register) |

Sample Program for the EM 241 Modem Module

Table 9 provides a sample program for the EM 241 Modem module.

TABLE 9

Example: Modem Module

```
Network 1                                    Network 1   // Call the MOD0_CTRL subroutine
    SM0.0      MOD0_CTRL                                 // on every scan.
    ──┤ ├──────┤EN       │                   LD    SM0.0
              │          │                   CALL  MOD0_CTRL, M0.0, VB10
              │  Done│-M0.0
              │ Error│-VB10

Network 2                                    Network 2   // Send a text message to a cell phone.
    I0.0       MOD0_MSG                       LD    I0.0
    ──┤ ├──────┤EN       │                    EU
                                              =     L63.7
    I0.0                                      LD    I0.0
    ──┤ ├──┤P├─┤START    │                    CALL  MOD0_MSG, L63.7, CellPhone, Message1,
        CellPhone-│Phone Done│-M0.0                 M0.0, VB10
        Message1- │Msg  Error│-VB10

Network 3                                    Network 3   // Transfer data to a remote CPU.
    I0.1       MOD0_XFR                       LD    I0.1
    ──┤ ├──────┤EN       │                    EU
                                              =     L63.7
    I0.1                                      LD    I0.1
    ──┤ ├──┤P├─┤START    │                    CALL  MOD0_XFR, L63.7, RemoteCPU, Transfer1,
        RemoteCPU-│Phone Done│-M0.0                 M0.0,
        Transfer1-│Data  Error│-VB10                VB10
```

S7-200 CPUs that Support Intelligent Modules

The EM 241 Modem module can be an intelligent expansion module designed to work with the S7-200 CPUs shown in Table 10.

TABLE 10

EM 241 Modem Module Compatibility with S7-200 CPUs

| CPU | Description |
| --- | --- |
| Cpu 222 Rel 1 10 or greater | Cpu 222 DC/DC/DC |
|  | Cpu 222 AC/DC/Relay |
| CPU 224 Rel 1 10 or greater | CPU 224 DC/DC/DC |
|  | CPU 224 AC/DC/Relay |
| CPU 226 Rel 1 00 or greater | CPU 226 DC/DC/DC |
|  | CPU 226 AC/DC/Relay |
| CPU 226XM Rel 1 00 or greater | CPU 226XM DC/DC/DC |
|  | CPU 226XM AC/DC/Relay |

Special Memory Location for the EM 241 Modem Module

Fifty bytes of special memory (SM) can be allocated to each intelligent module based on its physical position in the I/O expansion bus. When an error condition or a change in status is detected, the module can indicate this by updating the SM locations corresponding to the module's position. If it is the first module, it can update SMB200 through SMB249 as needed to report status and error information. If it is the second module, it can update SMB250 through SMB299, and so on as shown in Table 11.

TABLE 11

Special Memory Bytes SMB200 to SMB549

| Intelligent Module in Slot 0 | Intelligent Module in Slot 1 | Intelligent Module in Slot 2 | Intelligent Module in Slot 3 | Intelligent Module in Slot 4 | Intelligent Module in Slot 5 | Intelligent Module in Slot 6 |
| --- | --- | --- | --- | --- | --- | --- |
| SMB200 to SMB249 | SMB250 to SMB299 | SMB300 to SMB349 | SMB350 to SMB399 | SMB400 to SMB449 | SMB450 to SMB499 | SMB500 to SMB549 |

The Special memory data area, which can be allocated for the EM 241 Modem module, is shown in Table 12. This area can be defined as if this were the intelligent module located in Slot 0 of the I/O system.

TABLE 12

SM Locations for the EM 241 Modem Module

| SM Address | Description |
| --- | --- |
| SMB200 to SMB215 | Module name (16 ASCII characters) SMB200 is the first character. "EM241 Modem" |
| SMB216 to SMB219 | S/W revision number (4 ASCII characters) 5MB216 is the first character. |
| SMW220 | Error code<br>0000 - No error<br>0001 - No user power<br>0002 - Modem failure<br>0003 - No configuration block ID<br>0004 - Configuration block out of range<br>0005 - Configuration error<br>0006 - Country code selection error<br>0007 - Phone number too large<br>0008 - Message too large<br>0009 to 00FF - Reserved<br>01xx - Error in callback number xx<br>02xx - Error in pager number xx<br>03xx - Error in message number xx<br>0400 to FFFF - Reserved |
| SMB222 | Module status - reflects the LED status<br><br>MSB                                             LSB<br>  7    6    5    4    3    2    1    0<br>\| F \| G \| H \| T \| R \| C \| 0 \| 0 \|<br><br>F- EM_FAULT 0- no fault 1- fault<br>G- EM_GOOD 0- notgood 1- good<br>H- OFF_HOOK 0- on hook, 1- off hook<br>T- NO DIALTONE 0- dial tone 1- no dial tone<br>R- RING 0- not ringing 1- phone ringing<br>C- CONNECT 0- not connected 1- connected |
| SMB223 | Country code as set by switches (decimal value) |
| SMW224 | Baud rate at which the connection was established (unsigned decimal value). |
| SMB226 | Result of the user command<br><br>MSB                                             LSB<br>  7    6    5                               0<br>\| D \| 0 \|       ERROR       \|<br><br>D - Done bit;<br>0 - operation in progress<br>1 - operation complete<br>ERROR: Error Code Description, see Table 1 8 |
| SMB227 | Telephone number selector - This byte specifies which messaging telephone number to use when sending a message. Valid values are 1 through 250. |
| SMB22B | Message selector - This byte specifies which message to send. Valid values are 1 through 250. |
| SMB229 to SMB244 | Reserved |
| SMB245 | Offset to the first Q byte used as the command interface to this module. The offset is supplied by the CPU for the convenience of the user and is not needed by the module. |
| SMD246 | Pointer to the configuration table for the Modem module in V memory. A pointer value to an area other than V memory is not accepted and the module continues to examine this location, waiting for a non-zero pointer value. |

Additional Topics

Understanding the Configuration Table

The Modem Expansion wizard can be developed to automatically generate the configuration table based upon the answers given about a system. The following configuration table information is provided for advanced users who want to create their own Modem module control routines and format their own messages.

The configuration table can be located in the V memory area of the S7-200. As shown in Table 13, the Byte Offset column of the table can be the byte offset from the location pointed to by the configuration area pointer in SM memory. The configuration table information can be divided into four sections.

(a) The Configuration Block can contain information to configure the module.
(b) The Callback Telephone Number Block can contain the predefined telephone numbers allowed for callback security.
(c) The Message Telephone Number Block can contain the telephone numbers used when dialing messaging services or CPU data transfers.
(d) The Message Block can contain the predefined messages to send to the messaging services.

TABLE 13

Configuration Table for the Modem Module

| Byte Offset | Description |
|---|---|
| | Configuration Block |
| 0 to 4 | Module Identification - Five ASCII characters used for association of the configuration table to an intelligent module. Release 1.00 of the EM 241 Modem module expects "M241A". |
| 5 | The length of the Configuration Block - Currently 24. |
| 6 | Callback telephone number length - Valid values are 0 through 40. |
| 7 | Messaging telephone number length - Valid values are 0 through 120. |
| 8 | Number of callback telephone numbers - Valid values are 0 through 250. |
| 9 | Number of messaging telephone numbers - Valid values are 0 through 250. |
| 10 | Number of messages - Valid values are 0 through 250. |
| 11 to 12 | Reserved (2 bytes) |
| 13 | This byte contains the enable bits for the features supported.<br><br>MSB                                        LSB<br>7  6  5  4  3  2  1  0<br>\| PD \| CB \| PW \| MB \| BD \| 0 \| 0 \| 0 \|<br><br>PD - 0 = tone dialing 1 = pulse dialing<br>CB - 0 = callback disabled 1 = callback enabled<br>PW - 0 = password disabled 1 = password enabled<br>MB - 0 = PPI protocol enabled 1 = Modbus protocol enabled<br>BD - 0 = blind dialing disabled 1 = blind dialing enabled<br>Bits 2, 1 and 0 are ignored by the module |
| 14 | Reserved |
| 15 | Attempts - This value specifies the number of times the modem is to attempt to dial and send a message before returning an error. A value of 0 prevents the modem from dialing out. |
| 16 to 23 | Password - Eight ASCII characters |
| | Callback Telephone Number Block (optional) |
| 24 | Callback Telephone Number 1 - A string representing the first telephone number that is authorized for callback access from the EM 241 Modem module. Each callback telephone number must be allocated the same amount of space as specified in the callback telephone number length field (offset 6 in the Configuration Block). |
| 24 + callback number | Callback Telephone Number 2 |
| . | . |
| . | . |
| . | . |
| . | Callback Telephone Number n |
| . | |
| . | |
| | Messaging Telephone Number Block (optional) |
| M | Messaging Telephone Number 1 - A string representing a messaging telephone number which includes protocol and dialing options. Each telephone number must be allocated the same amount of space as specified in the messaging telephone number length field (offset 7 in the Configuration Block).<br>The messaging telephone number format is described below |
| M + messaging number length | Messaging Telephone Number 2 |
| . | . |
| . | . |
| . | . |
| . | Messaging Telephone Number n |
| . | |
| . | |
| | Message Block (optional) |
| N | V memory offset (relative to VB0) for the first message (2 bytes) |
| N + 2 | Length of message 1 |
| N + 3 | Length of message 2 |
| . | . |
| . | . |
| . | . |
| . | Length of message n |

TABLE 13-continued

Configuration Table for the Modem Module

| Byte Offset | Description |
|---|---|
| P | Message 1 - A string (120 bytes max.) representing the first message. This string includes text and embedded variable specifications or it could specify a CPU data transfer. See the Text Message Format and the CPU Data Transfer Format described below. |
| P + length of message 1 | Message 2 |
| . | . |
| . | . |
| . | . |
| . | Message n |
| . | |
| . | |

The EM 241 Modem module can re-read the configuration table when these events occur:
(a) Within five seconds of each STOP-to-RUN transition of the S7-200 CPU (unless the modem is currently online);
(b) Every five seconds until a valid configuration is found (unless the modem is currently online);
(c) Every time the modem transitions from an online to an offline condition.

Messaging Telephone Number Format

The Messaging Telephone Number can be a structure that contains the information needed by the EM 241 Modem module to send a message. The Messaging Telephone Number can be an ASCII string with a leading length byte followed by ASCII characters. The maximum length of a Messaging Telephone Number can be 120 bytes (which includes the length byte).

The Messaging Telephone Number can contain up to 6 fields separated by a forward slash (/) character. Back-to-back slashes indicate an empty (null) field. Null fields can be set to default values in the EM 241 Modem module.

Format: <Telephone Number>/<ID>/<Password/<Protocol>/<Standard>/<Format>

The Telephone Number field can be the telephone number that the EM 241 Modem module dials when sending a message. If the message being sent is a text or SMS message, this can be the telephone number of the service provider. If the message is a numeric page, this field can be the pager telephone number. If the message is a CPU data transfer, this can be the telephone number of the remote device. The maximum number of characters in this field can be 40.

The ID can be the pager number or cellular telephone number. This field can consist of the digits 0 to 9 only. If the protocol is a CPU data transfer, this field can be used to supply the address of the remote device. Up to 20 characters can be allowed in this field.

The Password field can be used to supply the a password for messages sent via TAP if a password is required by the service provider. For messages sent via UCP this field can be used as the originating address or telephone number. If the message is a CPU data transfer to another Modem module, this field can be used to supply the password of the remote Modem module. The password can be up to 15 characters in length.

The Protocol field can consist of one ASCII character which tells the EM 241 Modem module how it should format and transmit the message. The following values can be allowed:
(a) Numeric paging protocol (default)
(b) TAP
(c) UCP command 1
(d) UCP command 30
(e) UCP command 51
(f) CPU data transfer The Standard field can force the EM 241 Modem module to use a specific modem standard. The standard field can be one ASCII character. The following values can be allowed:
(a) Bell 103
(b) Bell 212
(c) V.21
(d) V.22
(e) V.22 bit
(f) V.23c
(g) V.32
(h) V.32 bit
(i) V.34 (default)

The Format field can be three ASCII characters that specify the number of data bits and parity to be used when transmitting the message. This field does not necessarily apply if the protocol is set to numeric paging. In certain embodiments, only the following two settings are allowed:
(a) 8N1-8 data bits, no parity, one stop bit (default)
(b) 7E1-7 data bits, even parity, one stop bit Text Message Format The Text Message Format can define the format of text paging or SMS messages. These types of messages can contain text and embedded variables. The text message can be an ASCII string with a leading length byte followed by ASCII characters. The maximum length of a text message can be 120 bytes (which includes the length byte).
(a) Format: <Text><Variable><Text><Variable> . . .

The Text field can consists of ASCII characters.

The Variable field can define an embedded data value that the EM 241 Modem module can read from the local CPU, formats, and place in the message. The percent (%) character can be used to mark the start and the end of a variable field. The address and the left fields can be separated with a colon. The delimiter between the Left and Right fields can be either a period or a comma and can be used as the decimal point in the formatted variable. The syntax for the variable field can be:

(a) %Address:Left.Right Format %

The Address field can specify the address, data type and size of the embedded data value (i.e. VD100, VW50, MB20 or T10). The following data types can be allowed: I, Q, M, S, SM, V, T, C, and AI. Byte, word and double word sizes can be allowed.

The Left field can define the number of digits to display left of the decimal point. This value can be large enough to handle the expected range of the embedded variable including a minus sign if needed. If Left is zero the value can be displayed with a leading zero. The valid range for Left can be 0 to 10.

The Right field can define the number of digits to display right of the decimal point. In certain embodiments, zeros to the right of the decimal point are always displayed. If Right is zero the number can be displayed without a decimal point. The valid range for Right can be 0 to 10.

The Format field can specify the display format of the embedded value. The following characters can be allowed for the format field:
 (a) i—signed integer
 (b) u—unsigned integer
 (c) h—hexadecimal
 (d) f—floating point/real Example: "Temperature=%VW100:3.1i % Pressure=%VD200:4.3f%"

CPU Data Transfer Message Format

A CPU data transfer, either a CPU-to-CPU or a CPU-to-Modbus data transfer, can be specified using the CPU Data Transfer Message Format. A CPU Data Transfer Message can be an ASCII string that can specify any number of data transfers between devices, up to the number of specifications that fit in the maximum message length of, for example, 120 bytes (119 characters plus a length byte). An ASCII space can be used to separate the data transfer specifications, but is not required. All data transfer specifications can be executed within one connection. Data transfers can be executed in the order defined in the message. If an error is detected in a data transfer, the connection to the remote device can be terminated and subsequent transactions are not processed.

If the operation is specified as a read, Count number of words can be read from the remote device starting at the Remote_address, and then written to V Memory in the local CPU starting at the Local_address.

If the operation is specified as a write, Count number of words can be read from the local CPU starting at the Local_address, and then written to the remote device starting at Remote_address.
 (a) Format: <Operation>=<Count>,<Local_address>,<Remote_address>

The Operation field can consist of one ASCII character and can define the type of transfer.
 (a) R—Read data from the remote device
 (b) W—Write data to the remote device The Count field can specify the number of words to be transferred. The valid range for the count field can be 1 to 100 words.

The Local_address field can specify the V Memory address in the local CPU for the data transfer (i.e. VW100).

The Remote_address field can specify the address in the remote device for the data transfer (i.e. VW500). This address can be specified as a V Memory address even if the data transfer is to a Modbus device. If the remote device is a Modbus device, the conversion between V Memory address and Modbus address can be as follows:
 (a) Modbus address=1+(V Memory address/2)
 (b) V Memory address=(Modbus address−1)*2

Example: R=20,VW100, VW200 W=50,VW500,VW1000 R=100,VW1000,VW2000

Although the invention has been described with reference to specific embodiments thereof, it will be understood that numerous variations, modifications and additional embodiments are possible, and accordingly, all such variations, modifications, and embodiments are to be regarded as being within the spirit and scope of the invention. For example, although one specific embodiment utilized a telephone network, the utilization of other communication networks, such as the Internet, are also within the spirit and scope of the invention. Also, references specifically identified and discussed herein are incorporated by reference as if fully set forth herein. Accordingly, the drawings and descriptions are to be regarded as illustrative in nature, and not as restrictive.

What is claimed is:

1. A system, comprising:
 a first programmable logic controller;
 a first modem integral to said first programmable logic controller, said first modem directly connected to an expansion input/output bus of said first programmable logic controller, said first modem not utilizing a central processing unit communications port;
 a second programmable logic controller; and
 a second modem coupled to said second programmable logic controller
 said first modem adapted to communicate with said second modem via a telephone network.

2. A system, comprising:
 a first programmable logic controller;
 a first modem integral to the first programmable logic controller, said first modem directly connected to an expansion input/output bus of said first programmable logic controller, said first modem not utilizing a central processing unit communications port;
 a second programmable logic controller; and
 a second modem coupled to the second programmable logic controller
 said first modem adapted to communicate with said second modem via a communications network.

3. A system, comprising:
 a first modem integral to a first programmable logic controller, said first modem directly connected to an expansion input/output bus of said first programmable logic controller, said first modem not utilizing a central processing unit communications port; and
 a second modem integral to a second programmable logic controller;
 said first modem adapted to communicate with said second modem via a communications network.

4. The method of claim 3, wherein the communications network is the Internet.

5. A system, comprising:
 a modulator integral to a first programmable logic controller, said modulator directly connected to an expansion input/output bus of said first programmable logic controller, said modulator not utilizing a central processing unit communications port; and
 a demodulator integral to a second programmable logic controller;
 said modulator adapted to communicate with said demodulator via a communications network.

6. A system, comprising:
a first programmable logic controller comprising an integral modulator, said modulator directly connected to an expansion input/output bus of said first programmable logic controller, said modulator not utilizing a central processing unit communications port; and
a second programmable logic controller comprising an integral demodulator;
said modulator adapted to communicate with said demodulator via a communications network.

7. A method for facilitating peer-to-peer communications between programmable logic controllers, comprising:
connecting a first programmable logic controller to a second programmable logic controllers via a modem integral to the first programmable logic controller, said modem directly connected to an expansion input/output bus of said first programmable logic controller, said modem not configured to utilize a central processing unit communications port;
transferring data between the first and second programmable logic controllers; and
disconnecting the first programmable logic controller from the second programmable logic controller.

8. A method, comprising:
modulating data in a first programmable logic controller, the modulated date transmitted via a modem directly connected to an expansion input/output bus of said first programmable logic controller, said modem not utilizing a central processing unit communications port;
transmitting the modulated data over a communications network; and
demodulating the modulated data in a second programmable logic controller.

9. A method, comprising:
coupling a first modem to a second modem, said first modem integral to a first programmable logic controller, said second modem connected to a second programmable logic controller, said first modem directly connected to an expansion input/output bus of said first programmable logic controller, said first modem not utilizing a central processing unit communications port; and
transferring data between said first modem and said second modem.

10. The method of claim 9, further comprising modulating data in the first modem.

11. The method of claim 9, further comprising transmitting modulated data over a communications network.

12. The method of claim 9, further comprising transmitting modulated data over an Internet connection.

13. The method of claim 9, further comprising receiving modulated data over a communications network.

14. The method of claim 9, further comprising demodulating received data in the second modem.

15. The method of claim 9, further comprising connecting the first modem and the second modem via a communications network.

16. The method of claim 9, further comprising disconnecting the first modem from the second modem.

17. The method of claim 9, wherein data is transferred between the first modem and the second modem via Modbus protocol.

18. The method of claim 9, wherein data is transferred between the first modem and the second modem via PPI protocol.

19. The method of claim 9, wherein data is transferred between the first modem and the second modem via an at least 10 bit modem protocol.

20. The method of claim 9, wherein data is transferred between the first modem and the second modem via a modem standard selected from V.21, V.22, V.22bis, V.32, V.32bis, V.34, V.34bis, and V.90.

21. A system, comprising:
means for coupling a first modem to a second modem, said first modem integral to a first programmable logic controller, said first modem directly connected to an expansion input/output bus of said first programmable logic controller, said first modem not utilizing a central processing unit communications port, said second modem integral to a second programmable logic controller; and
means for transferring data between said first modem and said second modem.

22. A system, comprising:
means for coupling a first modem to a second modem, said first modem integral to a first programmable logic controller, said first modem directly connected to an expansion input/output bus of said first programmable logic controller, said first modem not utilizing a central processing unit communications port, said second modem connected to a second programmable logic controller; and
means for transferring data between said first modem and said second modem.

23. A computer-readable medium containing instructions for activities comprising:
coupling a first modem to a second modem, said first modem integral to a first programmable logic controller, said first modem directly connected to an expansion input/output bus of said first programmable logic controller, said first modem not utilizing a central processing unit communications port, said second modem integral to a second programmable logic controller; and
transferring data between said first modem and said second modem.

* * * * *